United States Patent
Dobrinsky et al.

(10) Patent No.: US 9,696,484 B2
(45) Date of Patent: Jul. 4, 2017

(54) FLUID-BASED LIGHT GUIDING STRUCTURE AND FABRICATION THEREOF

(71) Applicant: Sensor Electronic Technology, Inc., Columbia, SC (US)

(72) Inventors: Alexander Dobrinsky, Loudonville, NY (US); Michael Shur, Latham, NY (US); Remigijus Gaska, Columbia, SC (US)

(73) Assignee: SENSOR ELECTRONIC TECHNOLOGY, INC., Columbia, SC (US)

( * ) Notice: Subject to any disclaimer, the term of this patent is extended or adjusted under 35 U.S.C. 154(b) by 0 days.

(21) Appl. No.: 14/853,057

(22) Filed: Sep. 14, 2015

(65) Prior Publication Data

US 2016/0077278 A1   Mar. 17, 2016

Related U.S. Application Data

(60) Provisional application No. 62/050,126, filed on Sep. 13, 2014.

(51) Int. Cl.
*G02B 6/10* (2006.01)
*G02B 6/122* (2006.01)

(52) U.S. Cl.
CPC .............. *G02B 6/10* (2013.01); *G02B 6/1221* (2013.01)

(58) Field of Classification Search
CPC ....................................................... G02B 6/10
See application file for complete search history.

(56) References Cited

U.S. PATENT DOCUMENTS

| | | |
|---|---|---|
| 4,045,119 A | 8/1977 | Eastgate |
| 5,675,689 A | 10/1997 | Nath |
| 6,163,641 A | 12/2000 | Eastgate |
| 6,314,227 B1 | 11/2001 | Nath |
| 6,418,257 B1 | 7/2002 | Nath |
| 6,476,409 B2 | 11/2002 | Iwasaki et al. |
| 6,773,584 B2 | 8/2004 | Saccomanno |
| 6,863,428 B2 | 3/2005 | Lundin |
| 6,936,854 B2 | 8/2005 | Iwasaki et al. |
| 7,016,566 B2 | 3/2006 | Dimas et al. |
| 7,211,763 B2 | 5/2007 | Zhang |

(Continued)

FOREIGN PATENT DOCUMENTS

WO    2005011753 A1    2/2005

OTHER PUBLICATIONS

Agilent Technologies, "Light Guide Techniques Using LED Lamps, Application Brief I-003," 2001, 22 pages.

(Continued)

*Primary Examiner* — Duy Deo
(74) *Attorney, Agent, or Firm* — Labatt, LLC

(57) ABSTRACT

A solution for fabricating a structure including a light guiding structure is provided. The light guiding structure can be formed of a fluoropolymer-based material and include one or more regions, each of which is filled with a fluid transparent to radiation having a target wavelength, such as ultraviolet radiation. The region(s) can be created using a filler material, which is at least substantially enclosed by the fluoropolymer-based material and subsequently removed from each region. The structure can further include at least one optical element integrated into the light guiding structure.

20 Claims, 12 Drawing Sheets

(56) References Cited

U.S. PATENT DOCUMENTS

| | | | |
|---|---|---|---|
| 7,613,378 | B2 | 11/2009 | Girardon et al. |
| 7,660,509 | B2 | 2/2010 | Bryan et al. |
| 7,914,852 | B2 | 3/2011 | Belz et al. |
| 7,960,706 | B2 | 6/2011 | Ullman |
| 8,177,383 | B2 | 5/2012 | Reuben |
| 8,434,909 | B2 | 5/2013 | Nichol et al. |
| 8,442,602 | B2 | 5/2013 | Wong et al. |
| 2003/0044149 | A1 | 3/2003 | Fraval et al. |
| 2004/0036560 | A1 | 2/2004 | Higuchi et al. |
| 2006/0002675 | A1 | 1/2006 | Choi et al. |
| 2009/0034236 | A1 | 2/2009 | Reuben |
| 2010/0014027 | A1 | 1/2010 | Li et al. |
| 2010/0165621 | A1 | 7/2010 | Hoffend, Jr. et al. |
| 2011/0149201 | A1 | 6/2011 | Powell et al. |
| 2011/0273906 | A1 | 11/2011 | Nichol et al. |
| 2011/0286222 | A1 | 11/2011 | Coleman |
| 2011/0309032 | A1 | 12/2011 | Makl |
| 2013/0106918 | A1* | 5/2013 | Bita .................. G02B 6/005 345/690 |
| 2013/0336839 | A1 | 12/2013 | Gil et al. |
| 2014/0001374 | A1 | 1/2014 | Ullman |
| 2014/0071142 | A1* | 3/2014 | Steyn ................ B81C 1/00095 345/531 |
| 2014/0373606 | A1* | 12/2014 | Kraiczek .......... G01N 33/54373 73/61.55 |
| 2015/0069265 | A1 | 3/2015 | Smetona et al. |
| 2015/0091043 | A1 | 4/2015 | Shur et al. |
| 2015/0360606 | A1 | 12/2015 | Thompson et al. |

OTHER PUBLICATIONS

Dupont, "Amorphous Fluoroplastic Resin," www.teflon.com/industrial, 2013, 4 pages.

Gore® Diffuse Reflector Product, printed from http://www.gore.com/en_xx/products/electronic/specialty/specialty.html?RDCT=gore.com on Sep. 5, 2014.

Joo, B., et al., "Design guidance of backlight optic for improvement of the brightness in the conventional edge-lit LCD backlight," 2010, 6 pages.

Li, C., et al., "Prism-pattern design of an LCD light guide plate using a neural-network optical model," 2010, 5 pages.

Yang, M., et al., "Optical properties of Teflon AF amorphous fluoropolymers," Jul.-Sep. 2008, 9 pages.

Colombe, Y., et al., "Single-mode optical fiber for high-power, low-loss UV transmission," Optics Express, Aug. 2014, p. 19783, vol. 22, No. 16.

Fevrier, S., et al., "Ultraviolet guiding hollow-core photonic crystal fiber," 2009, 2888-2890, Opt. Lett.34(19)X.

Gebert, F., et al., "Damage-free single-mode transmission of deep-UV light in hollow-core PCF," Optics Express, Jun. 2014, p. 15388, vol. 22, No. 13.

Gonschior, C. P., et al. "Characterization of UV single-mode and low-mode fibers," 2010, Proc. of SPIE vol. 7559 75590X-1.

Yamamoto, N., "Single-mode delivery of 250 nm light using a large mode area photonic crystal fiber," 2009, p. 16933-16940, Opt. Express17(19).

Kang, S. International Application No. US2015/049917, International Search Report and Written Opinion, Dec. 23, 2015, 13 pages.

International Application No. US2015/049922, International Search Report and Written Opinion, Mar. 18, 2016, 14 pages.

Bedtelyon, J. U.S. Appl. No. 14/853,014, Notice of Allowance, Nov. 21, 2016, 13 pages.

Bedtelyon, J., U.S. Appl. No. 14/853,014, Office Action1, Jul. 1, 2016, 19 pages.

Ippolito, U.S. Appl. No. 14/853,036, Office Action1, Sep. 14, 2016, 15 pages.

Ippolito, U.S. Appl. No. 14/853,036, Notice of Allowance, Jan. 23, 2017, 18 pages.

Martin, et al., "Ordered arrays of polymeric nanopores by using inverse nanostructured PTFE surfaces," 2012, 10 pages, IOP Publishing.

Bedtelyon, J., U.S. Appl. No. 14/853,014, Notice of Allowance, Feb. 28, 2017, 5 pages.

Ippolito, U.S. Appl. No. 14/853,036, Notice of Allowance, Mar. 1, 2017, 13 pages.

\* cited by examiner

46A

46B

46C

46D

FLUID-BASED LIGHT GUIDING STRUCTURE AND FABRICATION THEREOF

REFERENCE TO RELATED APPLICATIONS

The current application claims the benefit of U.S. Provisional Application No. 62/050,126, which was filed on 13 Sep. 2014, and which is hereby incorporated by reference.

TECHNICAL FIELD

The disclosure relates generally to light guiding structures, and more particularly, to fabrication of a light guiding structure including a fluid.

BACKGROUND ART

Liquid core waveguide or light guiding structures can be beneficial for guiding ultraviolet (UV) radiation, e.g., due to the low UV absorbance properties of some liquids, such as purified water. The general availability of water allows for the fabrication of relatively inexpensive light guides for UV radiation that can be readily adopted for use in industry. Combined with a light guide enclosure formed of a fluoropolymer having low UV absorbance and other beneficial properties (e.g., chemical inertness, low biological contamination), the benefits of thin light guiding UV layers can be easily appreciated.

These light guiding structures, or so-called liquid core waveguides or flow cells, have been developed for optical spectroscopy applications in the ultraviolet, visible, and infrared regions of the light spectra. Such flow cells are particularly suitable when combined with optical fibers for light transfer, enabling the design of a flexible sensor system. A number of flow cells having a long optical path length have been designed for absorbance, fluorescence, and Raman spectroscopy. Similar to optical fibers, light is confined in such flow cells within the (liquid) core by total internal reflection (TIR) at the liquid core/wall interface or the liquid core/cladding (coating) interface. The only requirement is that the liquid core refractive index be higher than that of the refractive index of the ambient. For liquid core comprising purified water, and for ambient being air, this requirement is easily satisfied.

One approach to employ liquid-based light guiding structures describes a reactor configuration for UV treatment of water utilizing TIR and a flow tube. The inlet and core of the cylindrical tank reactor unit is a transparent flow tube that is surrounded by a sealed, concentric volume of material having a lower refractive index than the fluid flowing in the flow tube, which enables TIR of UV light when it is directed axially into the flow tube. Another approach discloses a method and reactor for in-line treatment of fluids and gases by light radiation comprising a tube or a vessel made of transparent material, preferably quartz glass, and surrounded by air, and having a fluid inlet, a fluid outlet, and at least one opening or window adapted for the transmission of light from an external light source into the tube. Air outside the tube or vessel has a lower refractive index compared to the treated fluid, which enables TIR. Still other approaches discuss various aspects of a liquid core light guide. One such approach discusses a liquid core waveguide photon energy material processing system.

Other approaches discuss the fabrication of a liquid light guiding layer. FIGS. 1A and 1B show one approach for fabricating a fluoropolymer-based enclosure according to the prior art. In this approach, as shown in FIG. 1A, fluoropolymer pellets 2 are placed into a container 4. Subsequently, heat is applied, which results in the fluoropolymer pellets 2 melting into a continuous fluoropolymer-based enclosure 6 as shown in FIG. 1B. Such an approach is limited with respect to how thin and to what precision the dimensions of the enclosure 6 can be manufactured. Furthermore, selection of the fluoropolymer material forming the pellets 2 and the material of the container 4 needs to result in no significant adhesion between the fluoropolymer-based enclosure 6 and the container 4 to facilitate removal of the fluoropolymer-based enclosure 6 from the container 4.

FIGS. 2A and 2B show a side and top view, respectively, of a fluoropolymer-based enclosure 8 according to the prior art. In this case, a fluoropolymer-based film is folded over and subsequently fused along the edges 9A-9C. Such an approach requires a flexible fluoropolymer-based film and results in a flexible fluoropolymer-based enclosure 8, which may not be advantageous in some applications. Additionally, similar to other approaches, the exact dimensions, particularly the thickness, of the enclosure 8 are difficult to precisely control.

SUMMARY OF THE INVENTION

The inventors recognize a need for a solution providing a method of manufacturing a thin light guiding layer and/or a light guiding layer with additional optical and diffusive scattering components.

Aspects of the invention provide a solution for fabricating a structure including a light guiding structure. The light guiding structure can be formed of a fluoropolymer-based material and include one or more regions, each of which is filled with a fluid transparent to radiation having a target wavelength, such as ultraviolet radiation. The region(s) can be created using a filler material, which is at least substantially enclosed by the fluoropolymer-based material and subsequently removed from each region. The structure can further include at least one optical element integrated into the light guiding structure.

A first aspect of the invention provides a method of fabricating a light guiding structure, the method comprising: forming an intermediate structure including a first filler material at least substantially enclosed by a fluoropolymer-based material; removing the first filler material from the intermediate structure to create a first region; filling the first region with a first fluid transparent to radiation having a target wavelength; and sealing the first region from ambient after the filling.

A second aspect of the invention provides a method of fabricating a structure, the method comprising: fabricating a light guiding structure formed of a fluoropolymer-based material, wherein the light guiding structure includes a first region filled with a first fluid transparent to radiation having a target wavelength, wherein the first region is created using a filler material subsequently removed from the first region; and integrating at least one optical element into the light guiding structure.

A third aspect of the invention provides a method of fabricating a light guiding structure, the method comprising: forming an intermediate structure formed of a fluoropolymer-based material, wherein the intermediate structure includes a plurality of regions, each region defined by filler material at least substantially enclosed by the fluoropolymer-based material; removing the filler material from each of the plurality of regions; sealing a subset of the plurality of regions from ambient, wherein the plurality of regions includes at least one unsealed region; filling each unsealed region of the plurality of regions with a liquid transparent to radiation having a target wavelength; and sealing each unsealed region of the plurality of regions from ambient after the filling.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for fabricating a structure including a light guiding structure. The light guiding structure can be formed of a fluoropolymer-based material and include one or more regions, each of which is filled with a fluid transparent to radiation having a target wavelength, such as ultraviolet radiation. The region(s) can be created using a filler material, which is at least substantially enclosed by the fluoropolymer-based material and subsequently removed from each region. The structure can further include at least one optical element integrated into the light guiding structure. Embodiments of the light guiding structure can have thicknesses (as measured in a direction transverse to the propagation of light there through) of several micrometers.

Aspects of the invention can provide a method of fabricating a light guiding structure that can be thin (e.g., can be on the order of few microns, or even on the order of hundreds of nanometers) and can be easily utilized in small thin devices. An embodiment further provides a light guiding structure having a thickness on the order of few microns, or even on the order of hundreds of nanometers. Another embodiment provides a device, which includes a light guiding structure described herein.

As used herein, unless otherwise noted, the term "set" means one or more (i.e., at least one) and the phrase "any solution" means any now known or later developed solution. As also used herein, a layer is a transparent layer when the layer allows at least ten percent of radiation having a target wavelength, which is radiated at a normal incidence to an interface of the layer, to pass there through. A layer is highly transparent when the layer allows at least thirty percent of the radiation to pass there through, and a layer is substantially transparent when the layer allows at least eighty percent of the radiation to pass there through. Furthermore, as used herein, a layer is a reflective layer when the layer reflects at least ten percent of radiation having a target wavelength, which is radiated at a normal incidence to an interface of the layer and is highly reflective when the layer reflects at least eighty percent of the radiation. It is understood that a layer can be both transparent and reflective. In an embodiment, the target wavelength of the radiation corresponds to a wavelength of radiation emitted or sensed (e.g., peak wavelength +/−five nanometers) by an active region of an optoelectronic device during operation of the device. For a given layer, the wavelength can be measured in a material of consideration and can depend on a refractive index of the material. It is understood that, unless otherwise specified, each value is approximate and each range of values included herein is inclusive of the end values defining the range.

Figure 1A:
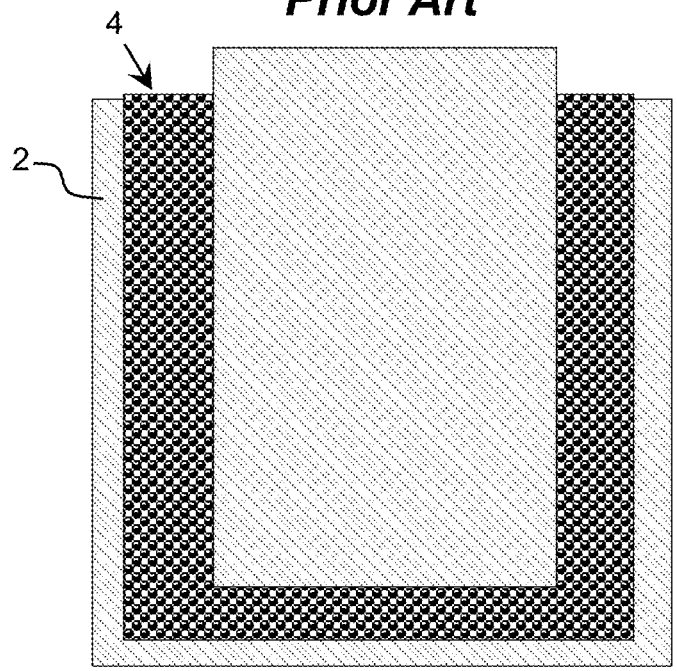
FIGS. 1A and 1B show one approach for fabricating a fluoropolymer-based enclosure according to the prior art.
Figure 1B:
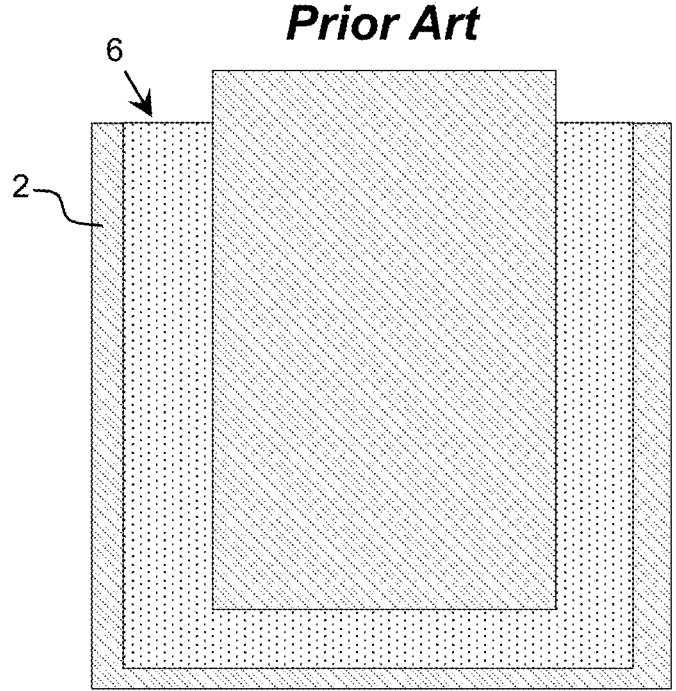
Figure 2A:
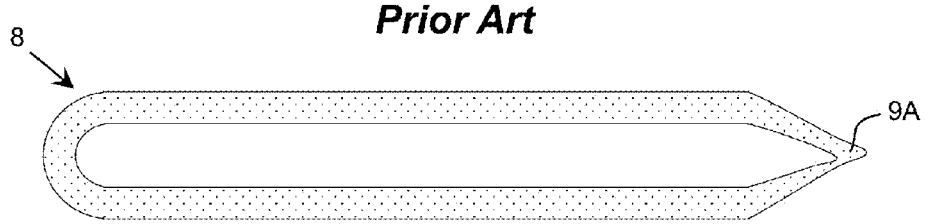
FIGS. 2A and 2B show a side and top view, respectively, of a fluoropolymer-based enclosure according to the prior art.
Figure 2B:
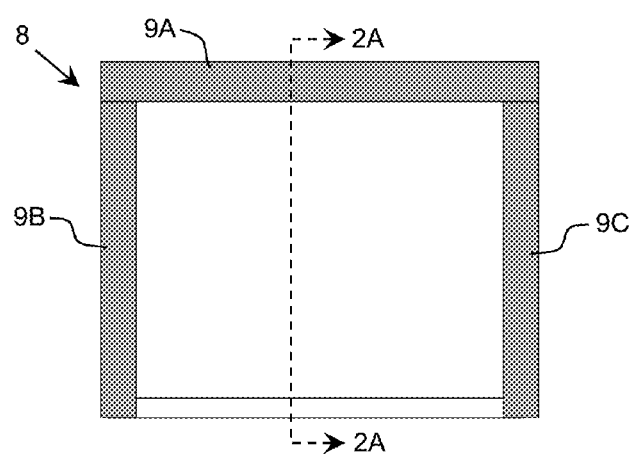
Figure 3A:
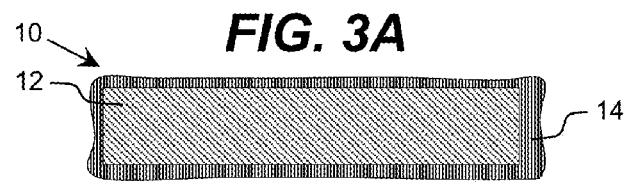
FIGS. 3A-3F show an illustrative process for forming a light guiding layer according to an embodiment.

Turning to the drawings, FIGS. 3A-3F show an illustrative process for forming a light guiding layer according to an embodiment. In FIG. 3A, a structure 10 including a thin fluoropolymer-based film 14 filled with a filler material 12 is fabricated. As used herein, a layer/film is thin when a thickness is significantly smaller than a characteristic absorption length for the corresponding target radiation (e.g., ultraviolet light). The characteristic absorption length can be measured as an inverse of the absorption coefficient for the material forming the layer and the corresponding target radiation. In an embodiment, the thickness is at most ten percent of the characteristic absorption length. A thickness of the filler material 12 can be defined based on an application of the light guiding layer fabricated therefrom as described herein.

Illustrative fluoropolymers forming the fluoropolymer-based film 14 include: fluorinated ethylene-propylene (EFEP), fluorinated ethylene propylene (FEP), perfluoroalkoxy (PFA), tetrafluoroethylene hexafluoropropylene vinylidene fluoride (THV), polytetrafluoroethylene (PTFE), polyvinylidene fluoride (PVDF), ethylene-tetrafluoroethylene (ETFE), ethylene chlorotrifluoroethylene (ECTFE), polychlorotrifluoroethene (PCTFE), a copolymer of tetrafluoroethylene and perfluoromethylvinylether (MFA), low density polyethylene (LDPE), perfluoroether (PFA), and/or the like. While primarily described in conjunction with fluoropolymers, it is understood that other comparable materials can be utilized. Illustrative materials include polylactide (PLA), fused silica, sapphire, THE, and/or the like. The filler material 12 can be any material that can be removed (e.g., etched) from the fluoropolymer-based film 14 using a process that does not damage the fluoropolymer-based film 14. In an embodiment, the filler material 12 is silicon dioxide. However, it is understood that any material that can be readily applied and dissolved, such as silicon nitride, and/or the like, can be utilized.

The structure 10 shown in FIG. 3A can be fabricated using any solution. For example, the filler material 12 can be applied onto a flat fluoropolymer-based film 14 using any solution, such as sputtering, until filler material 12 having desired dimensions has been formed. Alternatively, a layer (e.g., a sheet) of the filler material 12 having desired dimensions can be obtained (e.g., prepared) and placed adjacent to (e.g., onto, under, and/or the like) the fluoropolymer-based film 12. Subsequently, the fluoropolymer-based film 14 can be deposited around the filler material 12 using any solution, such as wrapping the filler material 12 with the fluoropolymer-based film 14 and subsequently heating the structure and allowing the fluoropolymer-based film 14 to set (harden) in order to seal the filler material 12 within the fluoropolymer-based film 14. In another embodiment, filler material 12 can be placed within a cavity including fluoropolymer-based pellets, such that the filler material 12 is surrounded by the fluoropolymer-based pellets. Subsequently, the fluoropolymer-based pellets can be heated to melt into a continuous film, forming the fluoropolymer-based film 14 tightly encapsulating the filler material 12. In this case, the dimensions of the cavity can be selected to result in the formation of a fluoropolymer-based film 14 having a desired thickness.

Figure 3B:
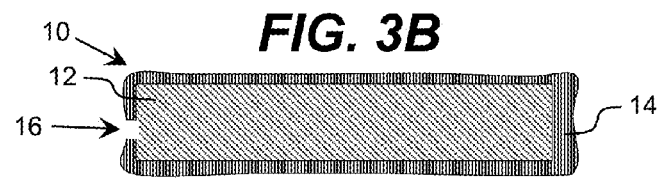

As shown in FIG. 3B, an opening 16 is formed in the fluoropolymer-based film 14 to expose the filler material 12 to the ambient. The opening 16 can be formed using any solution, such as mechanical removal of the fluoropolymer film using a drill, puncture, and/or the like, localized heating and/or chemical removal, etc. While the opening 16 is shown located on a side of the structure 10, it is understood that the opening 16 can be located in any desired location. Furthermore, it is understood that the opening 16 can have any dimension. While a single opening 16 is shown and described herein, it is understood that embodiments can use more than one opening 16.

Figure 3C:
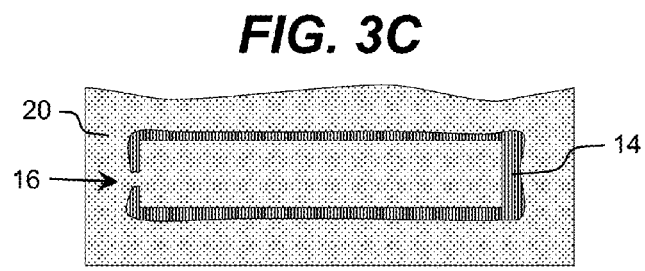

As shown in FIG. 3C, the filler material 12 (FIGS. 3A and 3B) can be removed from the fluoropolymer-based film 14 using any solution. For example, the filler material 12 can be removed using a chemical etching approach. In this case, the structure 10 (FIG. 3B) can be placed in a bath of a chemical 20 that reacts with (e.g., dissolves) the filler material 12, but preserves the fluoropolymer-based film 14. The chemical 20 can pass through the opening 16 and react with and etch the filler material 12. For example, when the filler material 12 is silicon dioxide, the chemical 20 can be hydro-fluoric acid. However, it is understood that this is only illustrative of various chemicals 20 and filler material 12 that can be utilized.

Figure 3D:
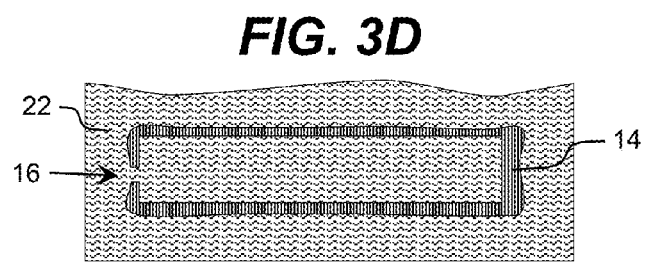

As shown in FIG. 3D, an interior void left after the filler material has been removed can be filled with a fluid 22. For example, the fluoropolymer-based film 14 can be placed within a bath of the fluid 22, which can enter and fill the interior void left after the filler material 12 has been removed through the opening 16. The fluoropolymer-based film 14 can be completely submerged within such a bath or submerged at least enough to allow the fluid 22 to completely fill the interior void. To this extent, the placement of the opening 16, angle with which the fluoropolymer-based film 14 is placed within a bath, and/or the like, can be selected to facilitate completely filling the interior void with the fluid 22. Alternatively, the fluid 22 can be poured into the void through the opening 16. It is understood that embodiments can utilize a combination of two or more fluids to fill the void. In embodiment, the fluids include a liquid and a gas. Alternatively, the void can be completely filled by one or more liquids.

Regardless, the fluid 22 can be transparent to ultraviolet radiation. In an embodiment, the fluid 22 is substantially transparent to ultraviolet radiation, in which case the fluid 22 has a transparency at least similar (e.g., within ten percent) to the transparency of purified water for light wavelengths in the range of 240 nanometers to 360 nanometers. In an embodiment, the fluid 22 is purified water as defined by the U.S. Food and Drug Administration. Alternatively, the fluid 22 can be water sufficiently clean for human consumption.

Figure 3E:
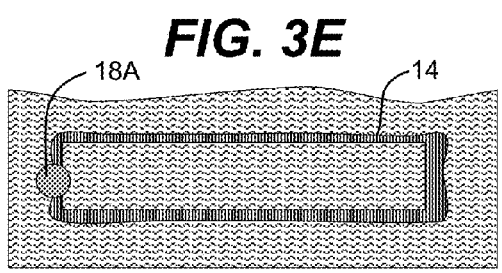
Figure 3F:
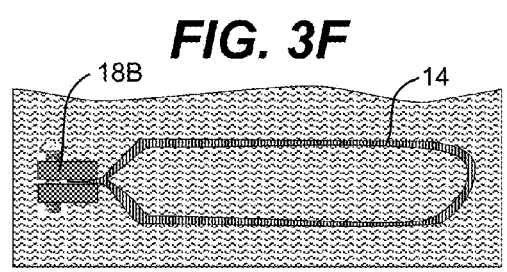

As shown in FIGS. 3E and 3F, the opening 16 can be sealed using any solution. In an embodiment, the opening 16 is sealed while the opening 16 in the fluoropolymer-based film 14 remains submerged within the fluid 22 bath, e.g., to help ensure that the fluoropolymer-based film 14 is completely filled with the fluid 22 after being sealed. However, it is understood that this need not be the case. As shown in FIG. 3E, the sealant can comprise a sealing material 18A. The sealing material 18A can be any material that can effectively bind to the fluoropolymer-based film 14 and is sufficiently stable over a target time period, such as a suitable type of epoxy. In an embodiment, the sealing material 18A is a fluoropolymer-based material, which is placed over the opening and heated to bind with the fluoropolymer-based film 14. As shown in FIG. 3F, the sealant can comprise a mechanical sealant 18B, such as a clamp and screw. However, it is understood that these approaches are only illustrative of various sealants that can be utilized.

Figure 4A:
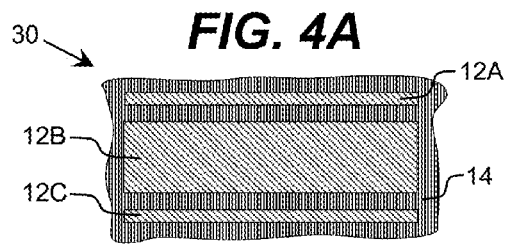
FIGS. 4A-4F show an illustrative process for forming a light guiding layer according to another embodiment.

FIGS. 4A-4F show an illustrative process for forming an alternative light guiding layer 30 according to another embodiment. In this case, the resulting structure includes multiple regions, which can include one or more different types of ultraviolet transparent fluid. In FIG. 4A, a structure 30 including a fluoropolymer-based film 14 encapsulating multiple distinct regions of filler material 12A-12C can be fabricated using any solution. For example, alternating layers of filler material 12A-12C and the fluoropolymer-based film 14 can be formed, the fluoropolymer-based film 14 can be wrapped around the layers of filler material 12A-12C to completely encapsulate them, and the fluoropolymer-based film 14 can be heated to seal the regions of filler material 12A-12C within the fluoropolymer-based film 14.

As illustrated, the structure 30 can include three regions of filler material 12A-12C, which can be arranged in a stack. Additionally, the regions of filler material 12A-12C can include one or more similar or distinct dimensions. For example, in the embodiment shown, the central region of filler material 12B has a larger thickness than the outer regions 12A, 12C, which have substantially similar thicknesses. However, it is understood that inclusion of three regions configured as shown is only illustrative. To this extent, in alternative embodiments, the structure 30 can include any number of two or more regions of filler material, arranged in any manner relative to one another, and having any combination of desired dimensions.

Figure 4B:
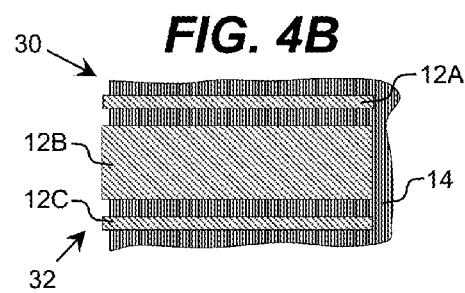

As shown in FIG. 4B, each of the regions of filler material 12A-12C can be exposed to ambient using any solution. For example, as shown in FIG. 3B, one or more openings 16 can be formed in the fluoropolymer-based film 14 to expose each region of filler material 12A-12C. Alternatively, as shown in FIG. 4B, some or all of a side 32 of the fluoropolymer-based film 14 can be removed to expose each region of filler material 12A-12C. For example, an elongated opening can be formed along the side 32 of the fluoropolymer-based film 14 having a depth sufficient to expose each region of filler material 12A-12C. In another embodiment, an entire side 32 of the fluoropolymer-based film 14 can be removed using any solution. In this case, an embodiment can include forming a structure 30 which does not completely encapsulate the regions of filler material 12A-12C with the fluoropolymer-based film 14, but at least substantially encapsulates the filler material 12A-12C, e.g., less than ten percent of the surface area is exposed. For example, the structure 30 can include filler material 12A-12C having only one side 32 (e.g., a side having the smallest dimension) exposed when the fluoropolymer-based film 14 is heated.

Figure 4C:
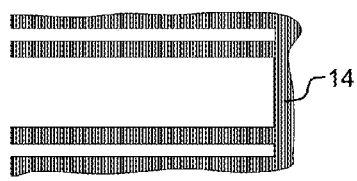

In FIG. 4C, the fluoropolymer-based film 14 is shown having the regions of filler material 12A-12C removed. Removal of the filler material 12A-12C can be done using any solution, e.g., chemical etching. When an entire side of a region of filler material 12A-12C is exposed, some or all of the filler material may be capable of being removed by sliding the filler material 12A-12C out from the fluoropolymer-based film 14. Subsequently, if necessary, any remaining filler material 12A-12C can be removed using, for example, chemical etching. Regardless, it is understood that these solutions are only illustrative.

Figure 4D:
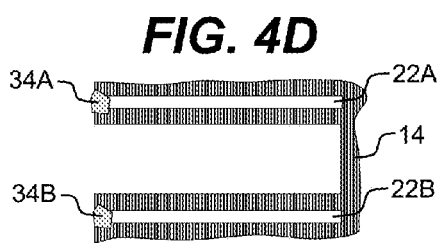

As shown in FIG. 4D, one or more of the regions vacated from the filler material 12A-12C can be encapsulated using any solution, such as a sealing material 34A, 34B, and/or the like. In this case, the corresponding ultraviolet transparent fluid 22A, 22B can be a gas having a low refractive index, such as ambient air. While FIG. 4D shows the outer two regions being encapsulated, it is understood that any combination of zero or more of the regions can be encapsulated to use a gas as the ultraviolet transparent fluid 22A, 22B. Furthermore, in another embodiment, all regions can be encapsulated, e.g., by applying a fluoropolymer-based film 14 over the side 32 (FIG. 4B) and heating the structure, and an opening can be reformed for a subset of the regions for which a different ultraviolet transparent fluid is desired to be utilized. While not shown, it is understood that the fluoropolymer-based film 14 can be placed in an environment including a gas other than ambient air to allow the gas to fill the vacated regions prior to sealing the regions with the sealing material 34A, 34B.

Figure 4E:
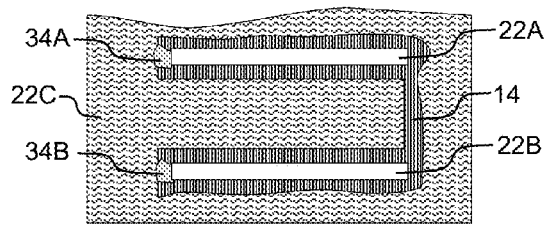
Figure 4F:
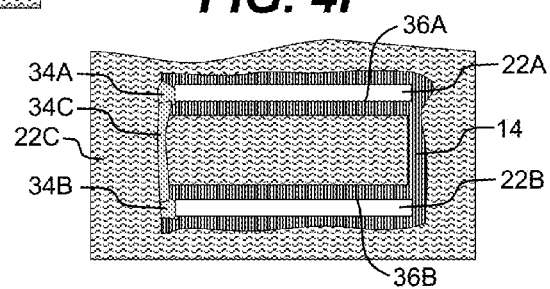

In FIG. 4E, the fluoropolymer-based film 14 can be placed within a fluid 22C (such as purified water), which can enter and fill the exposed region(s) of the fluoropolymer-based film 14. As shown in FIG. 4F, the exposed region(s) of the fluoropolymer-based film 14 can be encapsulated using any solution, e.g., by applying a sealing material 34C while the fluoropolymer-based film 14 remains within the fluid 22C.

The resulting structure can be configured to provide one or more benefits as compared to the structure formed from the process shown in FIGS. 3A-3F. For example, the fluids 22A, 22B can have a lower refractive index than that of the fluid 22C, thereby incorporating low refractive index guiding region(s) into the structure. Internal incorporation can ensure that there is no surface contamination present on either of the surfaces 36A, 36B, which could occur when the surfaces 36A, 36B are exposed to ambient, and which can reduce an effectiveness of using the structure as a light guide. In addition, the structure can be utilized within an ambient environment having a relatively high refractive index (e.g., within a liquid bath) without altering the light guiding properties of the structure.

When a fluid 22A, 22B is air, a gas, or the like, the corresponding fluoropolymer-based structure 14 can include one or more features configured to maintain a shape of the corresponding low refractive index guiding region filled with the fluid 22A, 22B. For example, the region can include one or more pillars, or similar structures, which can be formed from the fluoropolymer-based material. The pillars can be formed using any solution. For example, FIGS. 5A-5C show an illustrative process for forming pillars in a region according to an embodiment.

Figure 5A:
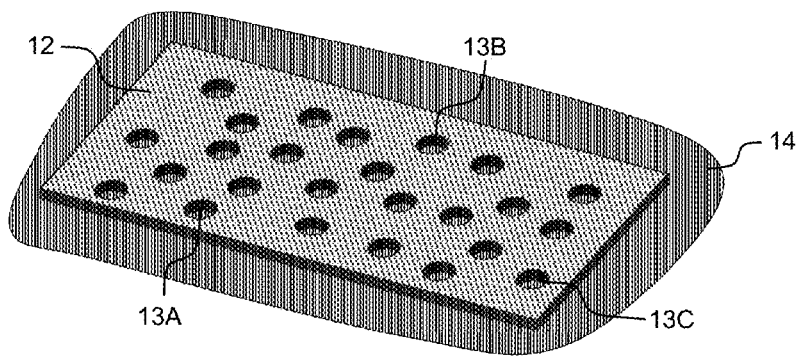
FIGS. 5A-5C show an illustrative process for forming pillars in a region according to an embodiment.

As shown in FIG. 5A, the filler material 12 includes a set of openings 13A-13C, which extend there through. The filler material 12 can include any number of one or more openings 13A-13C, which can be located in any pattern/random configuration and formed using any solution. Each opening 13A-13C can have a size sufficient to allow fluoropolymer-based material 14 to penetrate the opening 13A-13C when the filler material 14 is encapsulated. To this extent, the filler material 12 can be encapsulated by the fluoropolymer-based material 14, which can be a film, fluoropolymer-based pellets, and/or the like. Subsequently, the fluoropolymer-based material 14 can be heated as described herein, during which the fluoropolymer-based material 14 can penetrate and fill the openings 13A-13C. The fluoropolymer-based material 14 can be allowed to set, after which the filler material 12 can be removed, e.g., etched, using a process described herein.

Figure 5B:
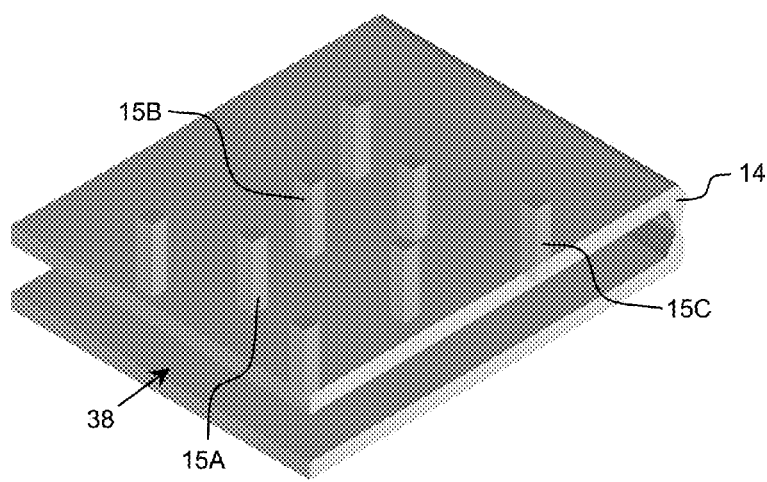
Figure 5C:
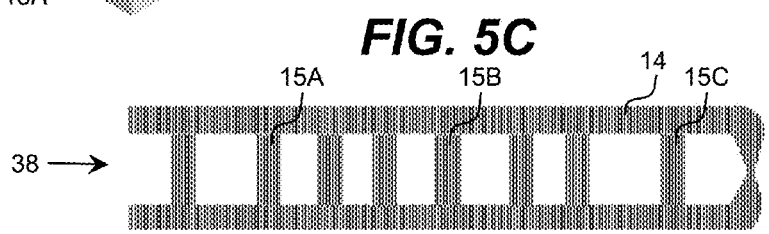

FIGS. 5B and 5C show perspective and side views of the resulting structure. As illustrated, the fluoropolymer-based material 14 forms a region 38 including a set of fluoropolymer-based pillars 15A-15C located therein. It is understood that the approach described herein is only illustrative of various approaches. For example, in another embodiment, the openings 13A-13C can be filled with a fluoropolymer-based material before the filler material 12 is encapsulated by the fluoropolymer-based material 14. In this case, the fluoropolymer-based material 14 can bond with the fluoropolymer-based material filling the openings 13A-13C when heated.

As described herein, the various structures can provide wave guiding in a system. To this extent, the structure can be located within the system such that light enters the structure at an angle optimal for wave guiding, e.g., at an angle larger than the total internal reflection angle for the structure.

Figure 6A:
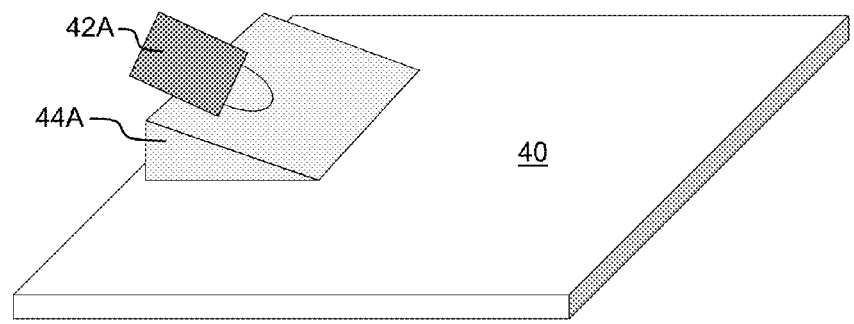
FIGS. 6A-6C show illustrative solutions for coupling an optoelectronic device to a light guiding structure according to embodiments.
Figure 6B:
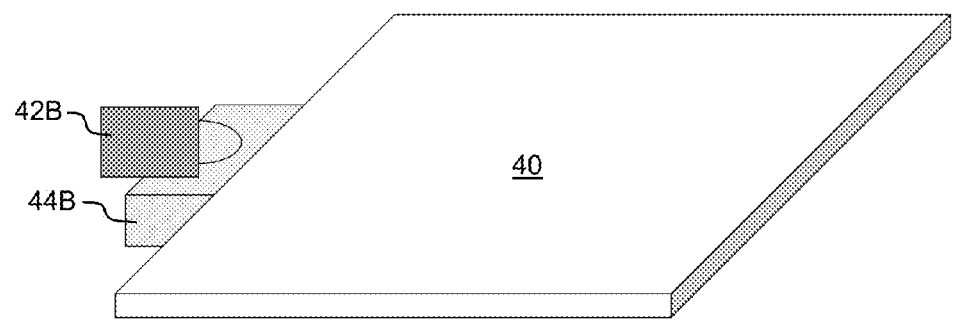
Figure 6C:
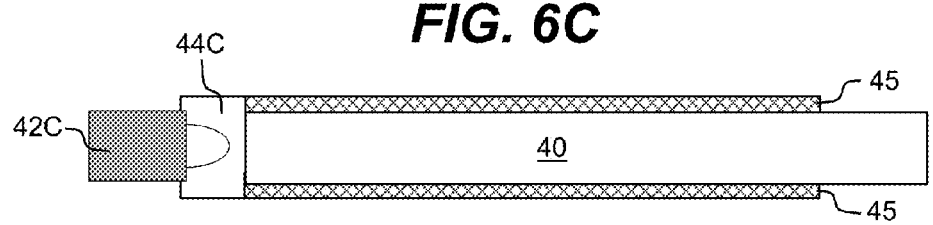

FIGS. 6A-6C show illustrative solutions for coupling an optoelectronic device 42A-42C to a light guiding structure 40 according to embodiments. Illustrative optoelectronic devices 42A-42C include a conventional or super luminescent light emitting diode, a light emitting laser, a laser diode, a light sensor, a photodetector, a photodiode, an avalanche diode, and/or the like. In an embodiment, the optoelectronic device 42A-42C is configured to operate as an ultraviolet light emitting device.

The light guiding structure 40 can be formed of a fluoropolymer-based material 14 and include one or more regions, each of which is filled with a fluid as described herein. In each case, the optoelectronic device 42A-42C can be embedded in a fluoropolymer-based domain 44A-44C, which is coupled to the light guiding structure 40. Each domain 44A-44C can be coupled to a desired location on the light guiding structure 40 using any solution, e.g., by locally heating a portion of the domain 44A-44C and/or structure 40 to allow the fluoropolymer-based material to flow. As illustrated in FIG. 6A, the optoelectronic device 42A can be fused into a side wall of the light guiding structure 40. Alternatively, as illustrated in FIGS. 6A and 6B, the optoelectronic device 42B, 42C can attached to an edge wall of the light guiding structure 40. While only a single optoelectronic device 42A-42C is shown in each of the drawings, it is understood that any number of optoelectronic devices 42A-42C can be coupled to the light guiding structure 40 in any of various possible combinations of locations.

Each domain 44A-44C can be configured to position the optoelectronic device 42A-42C at a desired angle with respect to the light guiding structure 40. For example, the angle can be selected to ensure that a majority of light (e.g., ultraviolet radiation) emitted by the corresponding optoelectronic device 42A-42C (e.g., ultraviolet light emitting diode), enters the light guiding structure 40 at an angle optimal for wave guiding. Similarly, the angle can be selected to ensure that light propagating through the light guiding structure 40 is directed onto a sensing surface of the optoelectronic device 42A-42C for sensing. However, it is understood that some portion of the light emitted by the optoelectronic device 42A-42C may not couple to the light guide, and may be radiated at the coupling interface.

As illustrated in FIG. 6C, an embodiment of the light guiding structure 40 can have one or more surfaces at least partially coated with a reflective film 45. The reflective film 45 can be configured to facilitate an increased coupling of the light emitted by the optoelectronic device 42C into the light guiding structure 40. Illustrative materials for forming the reflective film 45 include a reflective fluoropolymer, such as PTFE, and/or the like, a UV reflective film formed of aluminum, a highly ultraviolet reflective expanded polytetrafluoroethylene (ePTFE) membrane (e.g., GORE® Diffuse Reflector Material), and/or the like. The reflective film 45 can be applied to the surface(s) of the light guiding structure 40 using any solution, e.g., evaporation, sputtering, deposition from a liquid solution, and/or the like.

In an embodiment, the reflective film 45 has a variable spatial reflectivity. For example, a reflectivity of the reflective film 45 can decrease with distance away from the optoelectronic device 42C. It is understood that the reflective film 45 can be partially transparent and partially reflective, while maintaining constant absorption. The absorption characteristics of the reflective film 45 can be sufficiently small to allow significant light guiding and transmission. For example, as reflectivity of the reflective film 45 decreases, the transmission of the reflective film 45 can increase. Such changes in reflectivity of the reflective film 45 can promote uniform emission of light from an external surface of the reflective film 45. For example, the reflective film 45 can comprise a thin aluminum layer having openings wherein a size and/or density of the openings changes with distance from the optoelectronic device 42C to yield a target overall reflective and transparent properties of the reflective film 45. Alternatively, the reflective film 45 can comprise an alloy of reflective and transparent materials with a varying alloy composition.

The reflectivity of the reflective film 45 can be tailored for a particular application of the light guiding structure 40. For example, the reflectivity of the reflective film 45 can have a linear profile from highly reflective (near the optoelectronic device 42C) to a highly transparent film throughout a length of the light guiding structure 40. The reflectivity can range from a highly reflective film to complete transparency. Moreover, a type of reflectivity of the film can be attenuated as well. For example, the reflective film 45 can be specularly reflective in some domains while being diffusively reflective in other domains. Similarly, a transparency of the reflective film 45 can be specular or diffusive and can, in general, vary throughout the reflective film 45 depending on the application needs.

The solutions for fabricating a light guiding structure 40 described herein enables flexibility in the design of a shape of the light guiding structure 40 with a minimal increased cost. To this extent, a light guiding structure 40 fabricated as described herein can have any of various shapes, each of which can be configured to guide light (e.g., ultraviolet radiation) along a desired path. For example, FIGS. 7A-7D show illustrative light guiding structures 46A-46D, respectively, according to embodiments, each of which can be fabricated using a solution described herein.

Figure 7A:
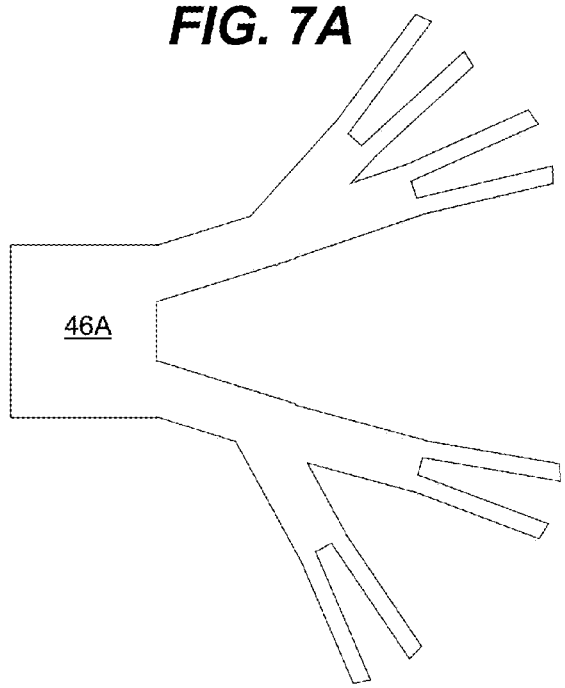
FIGS. 7A-7D show illustrative light guiding structures according to embodiments.
Figure 7B:
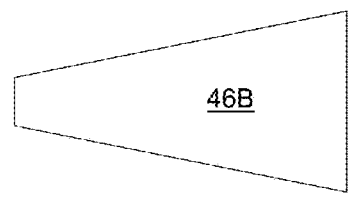
Figure 7C:
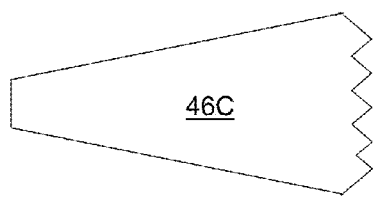
Figure 7D:
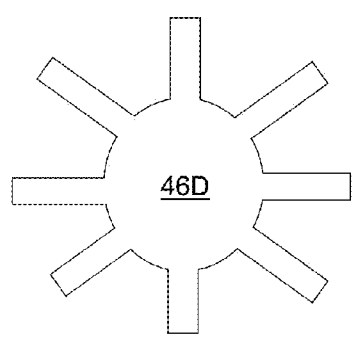

In FIG. 7A, the light guiding structure 46A includes multiple branches, and can be used to distribute radiation throughout a domain. In this case, the radiation can propagate along a path from the larger branches to the smaller branches (e.g., left to right in the drawing). Alternatively, the light guiding structure 46A can be used to combine radiation from throughout a domain, by guiding the radiation from the smaller branches to the larger branches (e.g., right to left in the drawing). In FIG. 7B, the light guiding structure 46B can be configured as a focusing element, in which case a cross-sectional area of the light guiding structure 46B can be changed to modify a directional distribution of the propagated light. For example, the light guiding structure 46B can have a truncated inverse pyramid or cone shape, which can act as a structure for collimating radiation. As illustrated in FIG. 7C, one or more surfaces of a light guiding structure 46C described herein can contain roughness or patterning, which can provide for diffusive output of the radiation from the light guiding structure 46C. Such roughness or patterning can be created using any solution, such as standard imprinting technology. FIG. 7D illustrates a light guiding structure 46D having a more complicated shape, which can be readily fabricated using a solution described herein.

Figure 8A:
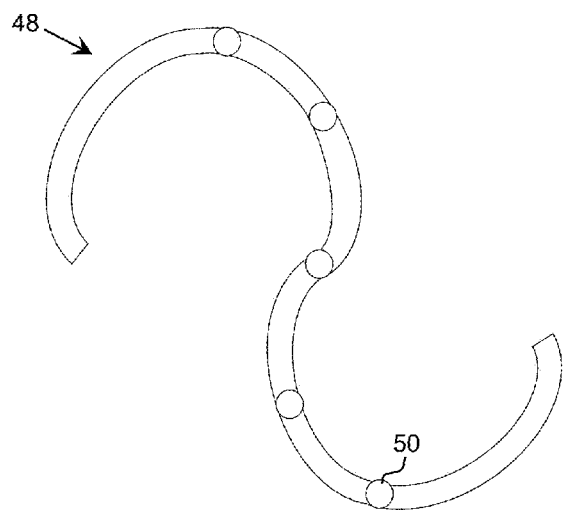
FIGS. 8A-8C show an illustrative light guiding structure according to an embodiment.
Figure 8C:
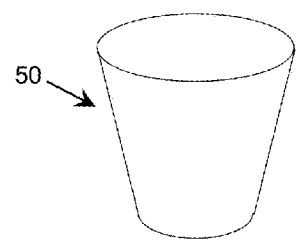
Figure 8B:
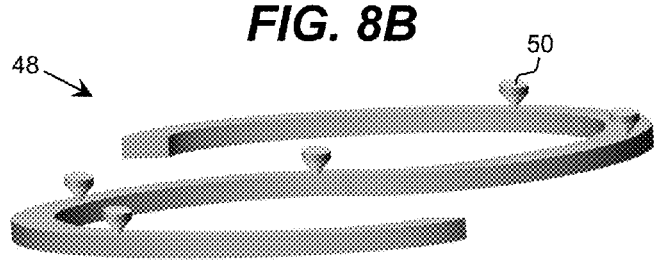

In still other embodiments, a light guiding structure fabricated using a solution described herein can have a bend and/or be elastic such that the structure can be bent to a desired bend without breaking. To this extent, FIGS. 8A-8C show an illustrative light guiding structure 48 according to an embodiment. As illustrated, the light guiding structure 48 can be fabricated with gradual bends and/or be bent into such a shape. In the latter case, the fluoropolymer material forming the light guiding structure 48 can have sufficient elasticity to enable the light guiding structure 48 to be bent. For example, EPTFE having a corresponding thickness can be utilized to enable a desired amount of bending. Additionally, multiple light guiding structures 48 can be connected together, e.g., to form a light guiding mesh, which allows for guiding radiation in a three-dimensional domain. Such a connection can be performed through welding individual light guiding structures into a complex structure, through a design of sockets that tightly attach one light guiding structure 48 to another, and/or the like.

In an embodiment, a light guiding structure described herein is included as part of a compound structure including one or more optical elements. As used herein, an optical element is a structure configured to extract, emit, sense, redirect, scatter, diffuse, focus, and/or the like, radiation propagating within or outside the light guiding structure. For example, FIGS. 8A-8C show an embodiment in which a light guiding structure 48 includes a set of light extraction elements 50, each of which allows a portion of radiation propagating through the light guiding structure 48 to be extracted therefrom. In an embodiment, each light extraction element 50 comprises a protrusion deposited over the light guiding structure 48 using any solution, e.g., by welding/fusing the light extraction element 50 to the light guiding structure 48. As best seen in FIG. 8C, a light extraction element 50 can be in a shape of an inverted truncated cone. However, it is understood that this is only illustrative, and a light extraction element 50 can have any of various alternative shapes including: a cylinder, a sphere, a pyramid, a cone, and/or the like. Furthermore, any combination of various types of light extraction elements 50 can be applied to the light guiding structure 48. In an embodiment, a characteristic dimension (e.g., the largest perpendicular cross-section) of each light extraction element 50 can be selected to be comparable to or exceed a thickness of the light guiding structure 48. Furthermore, a light extraction element 50 can comprise roughness elements, one or more lenses (e.g., Fresnel lenses), and/or the like.

Figure 9A:
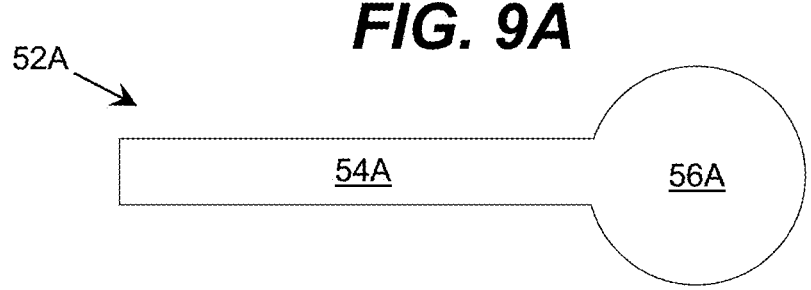
FIGS. 9A-9C show illustrative compound structures according to embodiments.
Figure 9B:
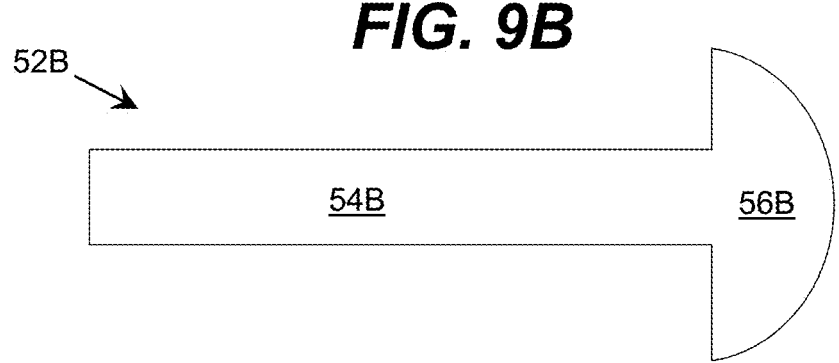
Figure 9C:
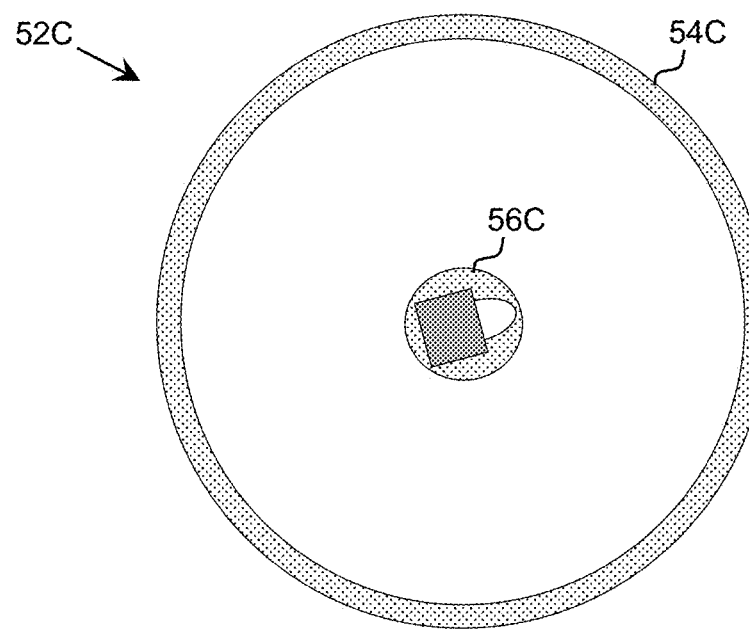

An illustrative compound structure can include an optical element fused with the light guiding structure. FIGS. 9A-9C show illustrative compound structures 52A-52C according to embodiments. Each compound structure 52A-52C includes a corresponding light guiding structure 54A-54C, each of which can be fabricated using a solution described herein.

In FIG. 9A, the compound structure 52A includes a light guiding structure 54A adhered to an optical element 56A, which can comprise a spherical lens, diffusive element, and/or the like. In FIG. 9B, the compound structure 52B includes a light guiding structure 54B adhered to an optical element 56B, which can comprise a lens. In each case, the optical element 56A, 56B can be filled with a fluid, engineered using a fluoropolymer described herein, comprise another type of ultraviolet transparent material (e.g., sapphire, fused silica, and/or the like), and/or the like. Regardless, it is understood that the optical elements 56A, 56B are only illustrative of various types of optical elements, which can be included. Other types of optical elements include a prism, a plate, and/or any other appropriate ultraviolet transparent protrusion designed to modify the spatial and/or angular distribution of the ultraviolet radiation guided through the corresponding light guiding structure 54A, 54B.

FIG. 9C shows a compound structure 52C, which includes an optical element 56C incorporated within the light guiding structure 54C. For example, the optical element 56C can comprise an ultraviolet radiation emitter encapsulated by a fluoropolymer material. The optical element 56C can be located within the light guiding structure 54C, which can be configured to affect one or more aspects of the radiation emitted by the emitter. For example, the light guiding structure 54C can comprise a sphere, which is configured to improve light extraction characteristics of the enclosed optical element 56C. While not shown, the optical element 56C can be held in a desired location within the light guiding structure 54C using any type of support structure (e.g., pillars), which can be fabricated using any solution.

Embodiments of a light guiding structure described herein can include an active optical element incorporated therein. As used herein, an active optical element comprises an element capable of having one or more attributes changed during operation of a system including the optical element. To this extent, an active optical element can include one or more components, which can be operated to dynamically alter one or more aspects of the operation of the optical element. For example, an active optical element can include one or more movable components, one or more components capable of changing shape, and/or the like, the result of which alters one or more aspects of the operation of the optical element. In an embodiment, the active optical element is a diffusive element.

Figure 10A:
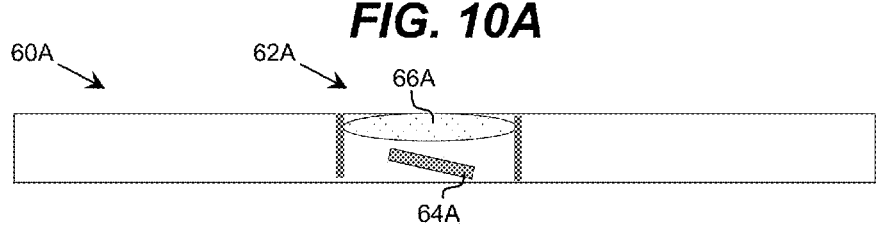
FIGS. 10A and 10B show illustrative light guiding structures including active optical elements according to embodiments.
Figure 10B:
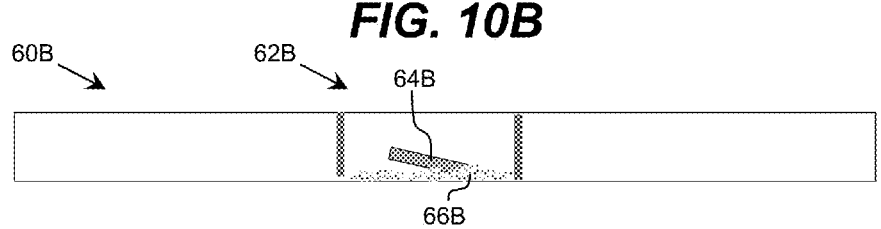

For example, FIGS. 10A and 10B show illustrative light guiding structures 60A, 60B including active optical elements 62A, 62B, respectively, according to embodiments. In each case, the active optical element 62A, 62B is defined by a region located within the light guiding structure 60A, 60B, which can be formed, for example, by transparent walls (e.g., formed of fluoropolymer) defining a compartment within the light guiding structure 60A, 60B corresponding to the active optical element 62A, 62B. Each active optical element 62A, 62B can include a movable component 64A, 64B, such as a magnetic stir. The movable component 64A, 64B can be moved to alter one or more optical properties of the optical element 62A, 62B.

For example, as shown in FIG. 10A, the movable component 64A can be operated to stir a bubble 66A present within the active optical element 62A, which can result in diffusive emission of ultraviolet radiation out of the active optical element 62A. In FIG. 10B, the movable component 64B can be operated to stir a reflective powder 66B located within the active optical element 62B, which can result in diffusive emission of ultraviolet radiation from the active optical element 62B. In each case, when the movable component 64A, 64B is not operated, the bubble 66A and reflective powder 66B can be located in a region of the active optical element 62A, 62B, which does not significantly impact the radiation propagating through the active optical element 62A, 62B. Regardless, it is understood that the active optical elements 62A, 62B and the configuration thereof, are only illustrative of various possible configurations. In other embodiments, an active optical element can include a mirror, diffuser, and/or the like, which can be actively or passively employed to alter one or more aspects of the radiation propagating through the corresponding light guiding structure.

Figure 11A:
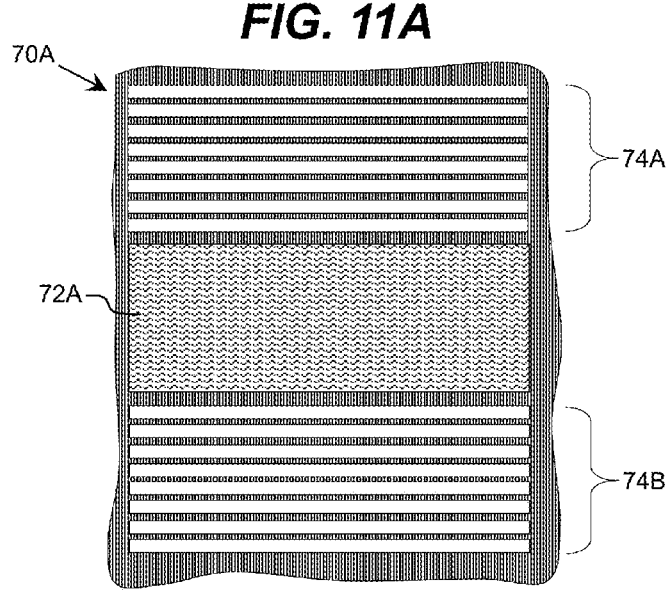
FIGS. 11A and 11B show illustrative light guiding structures according to embodiments.
Figure 11B:
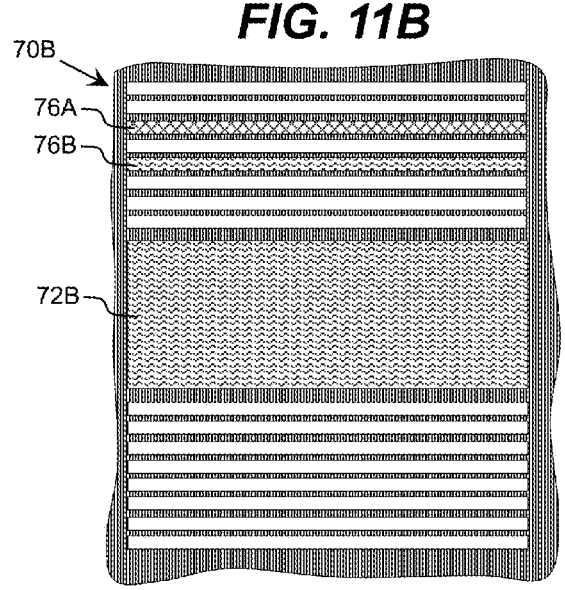

A light guiding structure described herein can be fabricated with numerous sub-regions, which can have various configurations and provide various functionality. For example, FIGS. 11A and 11B show illustrative light guiding structures 70A, 70B according to embodiments. Each light guiding structure 70A, 70B can be fabricated from a fluoropolymer-based material as described herein, and includes a central region with a fluid 72A, 72B located therein, which is configured to propagate radiation there through as described herein. Furthermore, each light guiding structure includes multiple layers located on opposing sides of the fluid 72A, 72B, one or more of which can include a low refractive index material, such as air. As used herein, a low refractive index material means a material having a refractive index at most ninety percent of the refractive index of the material forming adjacent layer(s) in a structure.

In FIG. 11A, the light guiding structure 70A can include multiple sub-regions 74A, 74B located on each side of the fluid 72A, which can be configured to at least partially implement a Bragg reflector. In this case, a thickness of each sub-region can be commensurable with the wavelength of the radiation propagating through the fluid 72A. However, for an incomplete Bragg reflector effect, a thickness can be several times the wavelength of the radiation and can have some variability in thicknesses. As illustrated in FIG. 11B, one or more sub-regions 76A, 76B can include a different material. For example, the sub-region 76A can include a material having fluorescent properties, e.g., in which the material emits visible light when exposed to ultraviolet radiation. Furthermore, the sub-region 76B can include a material having a different index of refraction from that of the adjacent sub-regions. To this extent, the sub-region 76B can be filled with an ultraviolet transparent fluid, which can be the same or different from the fluid 72B.

As described herein, a light guiding structure fabricated using a solution described herein can be configured to emit radiation from various locations. To this extent, FIGS.

Figure 12A:
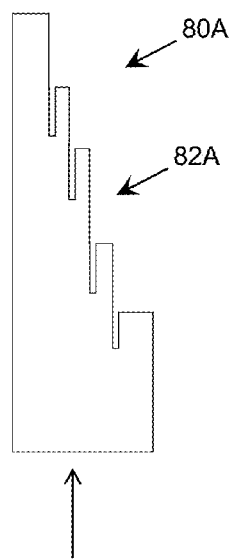
FIGS. 12A-12D show illustrative light guiding structures configured to emit radiation from multiple locations according to embodiments.
Figure 12B:
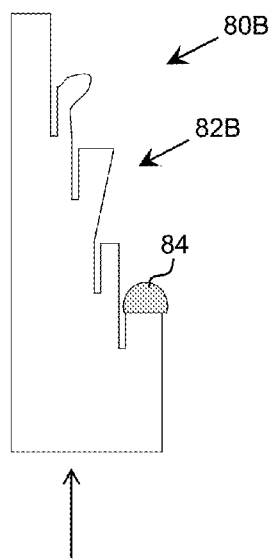
Figure 12C:
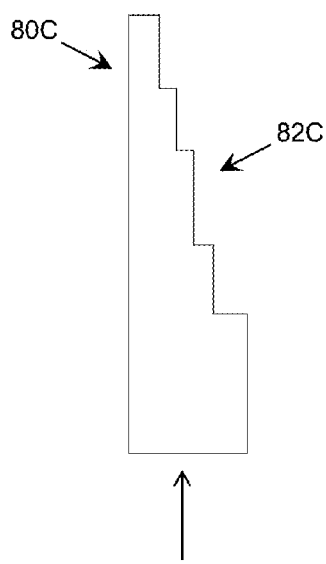
Figure 12D:
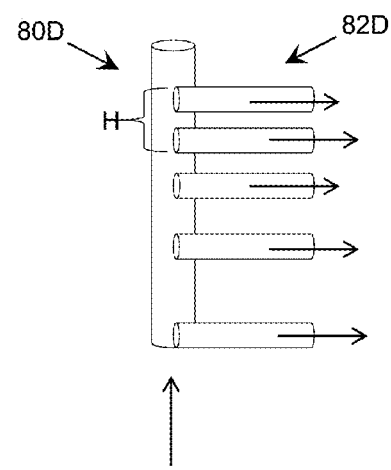

12A-12D show illustrative light guiding structures 80A-80D configured to emit radiation from multiple locations according to embodiments. In each case, the light guiding structure 80A-80D includes a series of steps 82A-82D, respectively, from which a portion of radiation propagating through the light guiding structure 80A-80D is emitted. As illustrated, a series of steps 82A-82D can include steps of varying thickness, which can be selected based on a desired amount of radiation to be emitted therefrom. Furthermore, as shown in the series of steps 82B, the steps can be protrusions, which can have varying shapes, can include an optical element 84 (e.g., a lens, such as a Fresnel lens imprinted onto an output (or input) surface of the light guiding structure 80B), can be formed of any type of transparent material described herein, and/or the like. Additionally, as shown in FIG. 12D, adjacent steps can have a distance H between each other in order to emit radiation in a desired manner, e.g., having a target intensity distribution. To this extent, it is understood that the distance H can vary between different steps in a series of steps 82A-82D.

While shown and described herein as a method of fabricating a structure including a light guiding structure, it is understood that aspects of the invention further provide various alternative embodiments. For example, embodiments of the invention further include the various structures shown and described herein. Additionally, embodiments of the invention include systems, such as ultraviolet-based sterilization systems, which incorporate a structure described herein, as well as the fabrication of such systems. To this extent, the fabrication of such a system can include integrating a structure described herein as well as connecting one or more of the electronic devices described herein to a control system capable of providing power to and operating the electronic device in a desired manner. Such integration and connections can be performed using any solution.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of fabricating a light guiding structure, the method comprising:
    forming an intermediate structure including a first filler material at least substantially enclosed by a fluoropolymer-based material;
    removing the first filler material from the intermediate structure to create a first region;
    filling the first region with a first fluid transparent to radiation having a target wavelength; and
    sealing the first region from ambient after the filling.

2. The method of claim 1, wherein the forming the intermediate structure includes:
    enclosing the first filler material with a film of the fluoropolymer-based material;
    heating the film after the enclosing; and
    creating an opening in the film to expose a portion of a surface of the first filler material to the ambient.

3. The method of claim 2, wherein the removing includes etching the first filler material using a chemical that dissolves the first filler material.

4. The method of claim 3, wherein the first filler material comprises silicon dioxide, the chemical comprises hydrofluoric acid, and the first fluid comprises purified water.

5. The method of claim 2, wherein the filling includes submerging the opening in the first fluid after the removing, and wherein the sealing includes applying a sealing material to the opening while the opening is submerged in the first fluid.

6. The method of claim 1, wherein the intermediate structure further includes a second filler material at least substantially enclosed by the fluoropolymer-based material, wherein the second filler material is separated from the first material by the fluoropolymer-based material, and wherein the method further comprises:
    removing the second filler material from the intermediate structure to create a second region;
    filling the second region with a second fluid transparent to radiation having the target wavelength; and
    sealing the second region from ambient after the filling.

7. The method of claim 6, wherein the second fluid is distinct from the first fluid.

8. The method of claim 7, wherein one of the first fluid or the second fluid comprises purified water and the other of the first fluid or the second fluid comprises a gas.

9. The method of claim 6, wherein at least one of the first or second filler material includes a set of openings extending there through, and wherein the fluoropolymer-based material penetrates the set of openings and forms a set of pillars in the corresponding at least one of the first or second regions.

10. The method of claim 1, further comprising integrating at least one optical element into the light guiding structure.

11. A method of fabricating a structure, the method comprising:
    fabricating a light guiding structure formed of a fluoropolymer-based material, wherein the light guiding structure includes a first region filled with a first fluid transparent to radiation having a target wavelength, wherein the fabricating includes:
        forming an intermediate structure including a first filler material at least substantially enclosed by a fluoropolymer-based material;
        removing the first filler material from the intermediate structure to create the first region;
        filling the first region with the first fluid; and
        sealing the first region from ambient after the filling; and
    integrating at least one optical element into the light guiding structure.

12. The method of claim 11, wherein the forming includes:
    at least substantially enclosing the filler material with a fluoropolymer-based film; and
    heating the fluoropolymer-based film after at least substantially enclosing the fluoropolymer-based material;
    wherein the removing includes etching the first filler material from the intermediate structure to create the first region.

13. The method of claim 11, wherein the integrating includes coupling an optoelectronic device to the light guiding structure, wherein the coupling positions the optoelectronic device at an angle with respect to the light guiding structure selected to provide maximum wave guiding of radiation emitted by the optoelectronic device in the light guiding structure.

14. The method of claim 13, wherein the fabricating the light guiding structure further includes applying a reflective film to at least a portion of a surface of the light guiding structure in an area near the optoelectronic device.

15. The method of claim 11, wherein the at least one optical element includes a light extraction element.

16. The method of claim 15, wherein the light extraction element is one of:
surface roughening of a region of a surface of the light guiding structure or a lens adhered to the light guiding structure.

17. The method of claim 11, wherein the at least one optical element includes an active optical element including at least one of: a set of bubbles or reflective powder.

18. A method of fabricating a light guiding structure, the method comprising:
forming an intermediate structure formed of a fluoropolymer-based material, wherein the intermediate structure includes a plurality of regions, each region defined by filler material at least substantially enclosed by the fluoropolymer-based material;
removing the filler material from each of the plurality of regions;
sealing a subset of the plurality of regions from ambient, wherein the plurality of regions includes at least one unsealed region;
filling each unsealed region of the plurality of regions with a liquid transparent to radiation having a target wavelength; and
sealing each unsealed region of the plurality of regions from ambient after the filling.

19. The method of claim 18, wherein the plurality of regions includes three regions aligned in a stack, and wherein the subset of the plurality of regions includes the outermost regions.

20. The method of claim 18, wherein the outermost regions include a plurality of pillars formed by the fluoropolymer-based material.

* * * * *